(12) United States Patent
Ohkubo (10) Patent No.: US 7,663,744 B2
(45) Date of Patent: Feb. 16, 2010

(54) INTEGRATING PHOTOMETER FOR MEASURING TOTAL FLUX OF LIGHT GENERATED FROM LIGHT SOURCE TO BE MEASURED, AND METHOD FOR MEASURING TOTAL FLUX OF LIGHT THROUGH USE OF THE SAME

(75) Inventor: Kazuaki Ohkubo, Kusatsu (JP)

(73) Assignee: Otsuka Electronics Co., Ltd., Osaka (JP)

( * ) Notice: Subject to any disclaimer, the term of this patent is extended or adjusted under 35 U.S.C. 154(b) by 0 days.

(21) Appl. No.: 12/252,576

(22) Filed: Oct. 16, 2008

(65) Prior Publication Data

US 2009/0109428 A1    Apr. 30, 2009

(30) Foreign Application Priority Data

Oct. 25, 2007    (JP) .............................. 2007-277771

(51) Int. Cl.
*G01J 1/00* (2006.01)
*G01J 1/04* (2006.01)

(52) U.S. Cl. ...................... 356/236; 356/213; 356/445; 250/228; 250/330

(58) Field of Classification Search ......... 356/213–236, 356/445–446; 250/559.29, 206.1, 208.2, 250/228

See application file for complete search history.

(56) References Cited

U.S. PATENT DOCUMENTS 3,916,690 A * 11/1975 Brandli .................. 374/129
4,378,159 A * 3/1983 Galbraith ................ 356/237.3
4,601,576 A * 7/1986 Galbraith ................ 356/237.3
4,915,500 A * 4/1990 Selkowitz ............... 356/221
4,995,727 A * 2/1991 Kawagoe et al. ........... 356/402

(Continued)

FOREIGN PATENT DOCUMENTS

EP    0 599 024    6/1994

(Continued)

OTHER PUBLICATIONS

JIS C-8152: Measuring Methods Of White Light Emitting Diode For General Lighting, Japanese Standards Association, Jul. 20, 2007.

(Continued)

*Primary Examiner*—Sang Nguyen
(74) *Attorney, Agent, or Firm*—Ditthavong Mori & Steiner, P.C.

(57) ABSTRACT

A mirror is provided with a light source window and an illumination window each establishing communicative connection between an inner face side and an outer side of a hemispherical unit. The light source window is an opening to which a light source OBJ to be measured is attached mainly. The illumination window is an opening for guiding a flux of light from a correcting light source used for measurement of self-absorption toward the inner face of the hemispherical unit. A self-absorption correcting coefficient of the light source OBJ is calculated based on an illuminance by a correcting flux of light in a case where the light source to be measured OBJ in a non-light emitting state is attached to the light source window and an illuminance by a correcting flux of light in a case where a calibration mirror is attached to the light source window.

8 Claims, 8 Drawing Sheets

U.S. PATENT DOCUMENTS

| | | |
|---|---|---|
| 5,430,540 A | 7/1995 | Ohkubo |
| 5,517,315 A * | 5/1996 | Snail et al. .................. 356/445 |
| 6,995,355 B2 * | 2/2006 | Rains et al. ................. 250/228 |
| 7,283,222 B1 | 10/2007 | Ohkubo |
| 7,554,665 B2 * | 6/2009 | Wadman ..................... 356/446 |
| 2003/0015643 A1 * | 1/2003 | Veith et al. .................. 250/205 |
| 2003/0230715 A1 * | 12/2003 | Remillard et al. ........... 250/330 |
| 2005/0156103 A1 | 7/2005 | May et al. |

FOREIGN PATENT DOCUMENTS

JP        6-167388        6/1994

OTHER PUBLICATIONS

Y. Ohno, "Integrating sphere simulation: application to total flux scale realization", Applied Optics, pp. 2637-2647, vol. 33, No. 13, May 1, 1994.

* cited by examiner

INTEGRATING PHOTOMETER FOR MEASURING TOTAL FLUX OF LIGHT GENERATED FROM LIGHT SOURCE TO BE MEASURED, AND METHOD FOR MEASURING TOTAL FLUX OF LIGHT THROUGH USE OF THE SAME

BACKGROUND OF THE INVENTION

1. Field of the Invention

The present invention relates to an integrating photometer for measuring a total flux of light generated from a light source to be measured, and a method for measuring the total flux of light through use of the same. More particularly, the present invention relates to a configuration suitable for measurement of a total flux of light from a surface light source.

2. Description of the Background Art

As a typical device for measuring a total flux of light from a light source, there has been known a spherical integrating photometer including an integrating sphere. The integrating sphere has an inner face to which a diffuse reflection material (e.g., barium sulfate, PTFE (polytetrafluoroethylene)) is applied. A light source to be measured is installed in the integrating sphere and a flux of light generated from the light source to be measured is reflected repeatedly by the inner face of the integrating sphere, in order to render an illuminance at the inner face of the integrating sphere uniform. The spherical integrating photometer utilizes a characteristic that this uniform illuminance is proportional to a total flux of light from the light source to be measured. In general, a total flux of light measured by such a spherical integrating photometer takes a relative value; therefore, an absolute value of the total flux of light from the light source to be measured is obtained by comparison with a result of measurement (a standard value) in a case where a total flux of light generated from a known total-flux-of-light standard light source is used.

The spherical integrating photometer described above has the following disadvantage. That is, it is inevitable that light absorption occurs at a supporting structure for installing the light source to be measured in the integrating sphere, a baffle for preventing light generated from the light source to be measured from entering directly into a light receiving unit for measuring an illuminance, and the like. In addition, the light source to be measured also absorbs light.

As one of countermeasures against such light absorption, use of a coefficient for correcting self-absorption by the light source to be measured is disclosed in "JIS C-8152: Measuring methods of white light emitting diode for general lighting". This self-absorption correcting coefficient is calculated as follows. That is, a self-absorption measuring light source (typically, a white LED (Light Emitting Diode)) is provided for preventing generated light from entering directly into the light receiving unit. Then, an output from the light receiving unit, which is generated in accordance with a flux of light from the self-absorption measuring light source in a case where a light source to be measured is installed in the integrating sphere, is compared with an output from the light receiving unit, which is generated in accordance with a flux of light from the self-absorption measuring light source in a case where the light source to be measured is not installed in the integrating sphere, to calculate a ratio therebetween. However, this method fails to correct light absorption by a supporting structure, a baffle and the like.

In order to avoid an influence of the light absorption by the supporting structure and the like, there has been proposed a hemispherical integrating photometer as disclosed in Japan Patent Laying-Open No. 06-167388. In place of the integrating sphere described above, this hemispherical integrating photometer includes an integrating hemisphere having a hemispherical inner wall to which a light diffusing material is applied, and a planar mirror provided such that a mirror face thereof covers an opening of the integrating hemisphere. Herein, a light source to be measured is installed at a center of the planar mirror such that a center thereof is aligned with a center of curvature of an inner hemisphere of the integrating hemisphere.

With this configuration, the light source to be measured and a virtual image of the light source to be measured, which is formed by the planar mirror, exist in an integrating sphere (a space formed by a combination of the integrating hemisphere and the virtual image of the integrating hemisphere). That is, the planar mirror and the integrating hemisphere provide with a state as if the light source to be measured lights up without provision of a supporting structure for fixing the light source at the space in the integrating sphere, leading to avoidance of light absorption by the supporting structure such as a lighting jig.

However, the light absorption by the light source to be measured is inevitable even when the hemispherical integrating photometer described above is used. In the case of using the hemispherical integrating photometer, particularly, the light source to be measured is attached on the planar mirror side; therefore, a surface light source having a relatively large light emitting area can be used as the light source to be measured. In such a case, occasionally, an amount of the light absorption by the light source to be measured is not negligible.

If the self-absorption measuring light source described above is provided for correcting the light absorption by the light source to be measured, there may arise a new problem. That is, if the self-absorption measuring light source is provided, a virtual image of the self-absorption measuring light source also exists in the integrating sphere. As described above, the baffle or the like must be provided for preventing the light from the self-absorption measuring light source from entering directly into the light receiving unit. However, the baffle becomes relatively large in size in order to avoid the direct entering of the light from the self-absorption measuring light source and the virtual image thereof into the light receiving unit. Consequently, unevenness in illuminance occurs in the integrating sphere by the baffle and the self-absorption measuring light source, resulting in a new measurement error due to the unevenness in illuminance.

SUMMARY OF THE INVENTION

The present invention has been devised to solve the problem described above, and an object thereof is to provide a hemispherical integrating photometer capable of correcting light absorption by a light source to be measured or the like, and a method for measuring a total flux of light through use of the integrating photometer.

According to one aspect of the present invention, there is provided an integrating photometer for measuring a total flux of light generated from a light source to be measured. The integrating photometer includes a hemispherical unit having a light diffuse reflection layer provided on an inner face thereof, a plate-shaped mirror provided so as to intersect at a substantial center of curvature of the hemispherical unit and to block an opening of the hemispherical unit, a light receiving unit measuring an illuminance at the inner face of the hemispherical unit, and a correcting light source generating a correcting flux of light. The mirror includes a first window provided at a region including the substantial center of curvature of the hemispherical unit, the light source to be measured is attachable to the first window such that a flux of light generated from the light source to be measured is guided toward the inner face of the hemispherical unit, and a second window provided at a position spaced away from the first window by a predetermined distance. The correcting light source is provided so as to emit the correcting flux of light to the inner face of the hemispherical unit through the second window.

Preferably, the first window is configured such that a calibration mirror having a size equal to that of an opening region of the first window is attachable along an identical plane with a mirror face of the mirror. The integrating photometer further includes a correcting coefficient calculating unit calculating a correcting coefficient resulted from light absorption by the light source to be measured, based on a first illuminance measured in a case where the light source to be measured in a non-light emitting state is attached to the first window and the correcting light source is in a light emitting state, and a second illuminance measured in a case where the calibration mirror is attached to the first window and the correcting light source is in the light emitting state.

More preferably, the integrating photometer further includes a total-flux-of-light calculating unit calculating a total flux of light generated from the light source to be measured, based on a third illumination measured in a case where the light source to be measured in the light emitting state is attached to the first window, and the correcting coefficient.

More preferably, the correcting light source is configured such that an amount of the correcting flux of light to be emitted to the inner face of the hemispherical unit through the second window has a prescribed value in advance. The total-flux-of-light calculating unit calculates an absolute value of the total flux of light generated from the light source to be measured, based on the first illumination, the third illumination, the correcting coefficient, and the amount of the correcting flux of light.

Preferably, the light receiving unit includes a spectrometer unit measuring an illuminance at the inner face of the hemispherical unit for each wavelength. The correcting coefficient calculating unit calculates the correcting coefficient for each wavelength.

Preferably, the light receiving unit measures the illuminance through a third window provided on one of the hemispherical unit and the mirror. The integrating photometer further includes a shielding unit provided on a path extending from the first window to the third window.

According to another aspect of the present invention, there is provided a method for measuring a total flux of light generated from a light source to be measured. The method includes a step of preparing an integrating photometer. The integrating photometer includes a hemispherical unit having a light diffuse reflection layer provided on an inner face thereof, and a plate-shaped mirror provided so as to intersect at a substantial center of curvature of the hemispherical unit and to block an opening of the hemispherical unit. The mirror includes a first window and a second window provided at a position spaced away from the first window by a predetermined distance. The method also includes a step of attaching a calibration mirror having a size equal to that of an opening region of the first window to the first window along an identical plane with a mirror face of the mirror, a step of guiding a correcting flux of light to the inner face of the hemispherical unit through the second window, a step of measuring as a first illuminance an illuminance at the inner face of the hemispherical unit, and a step of attaching the light source to be measured to the first window such that a direction of generation of a flux of light is oriented to the inner face of the hemispherical unit. The light source to be measured is in a non-light emitting state. The method also includes a step of guiding the correcting flux of light to the inner face of the hemispherical unit through the second window, a step of measuring as a second illuminance an illuminance at the inner face of the hemispherical unit, a step of calculating a correcting coefficient resulted from light absorption by the light source to be measured, based on the first and the second illuminance, a step of measuring as a third illuminance an illuminance at the inner face of the hemispherical unit in a state that the light source to be measured emits light, and a step of calculating a total flux of light generated from the light source to be measured, based on the third illuminance and the correcting coefficient.

The present invention has an advantage capable of correcting light absorption by a light source to be measured or the like.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

With reference to the drawings, hereinafter, detailed description will be given of preferred embodiments of the present invention. It is to be noted that identical reference symbols in the drawings denote identical or corresponding units; therefore, description of such units will not be given repeatedly.

First Embodiment

<Device Configuration>

Figure 1:
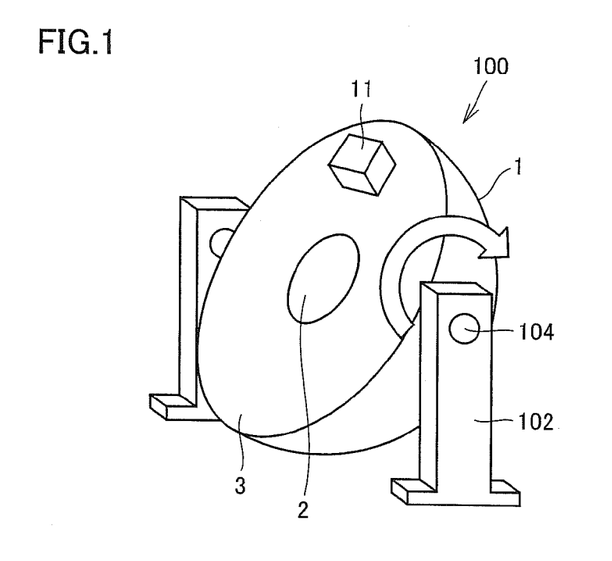
FIG. 1 shows an outer appearance of an integrating photometer according to a first embodiment of the present invention.

With reference to FIG. 1, an integrating photometer 100 according to a first embodiment of the present invention includes a hemispherical unit 1, and a disc-shaped mirror 3 provided so as to block an opening of hemispherical unit 1. Moreover, hemispherical unit 1 is rotatably coupled to a base unit 102 via a rotation shaft 104.

Figure 2:
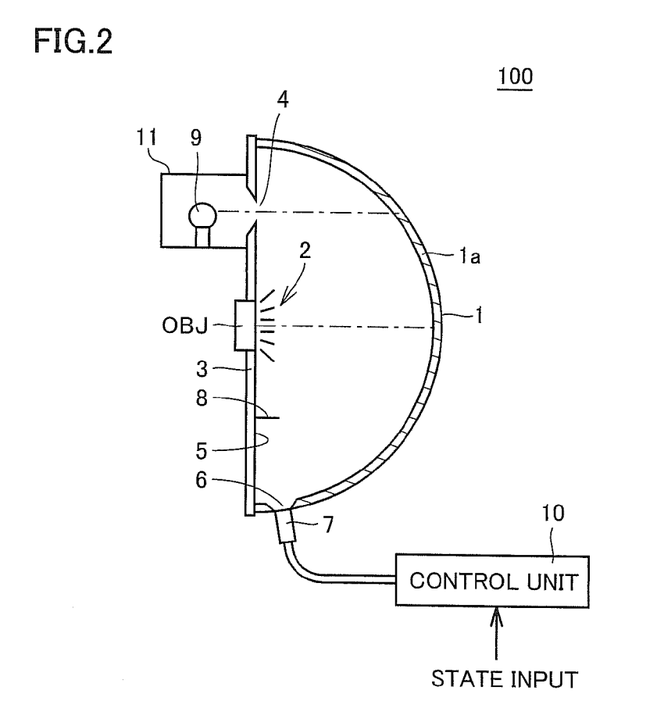
FIG. 2 schematically shows a sectional structure of the integrating photometer according to the first embodiment of the present invention.

With reference to FIGS. 1 and 2, a light diffuse reflection layer 1a is formed on an inner face (an inner wall) of hemispherical unit 1. Typically, light diffuse reflection layer 1a is formed in such a manner that a light diffusing material such as barium sulfate or PTFE (polytetrafluoroethylene) is applied to or sprayed on the inner face.

Disc-shaped mirror 3 is provided so as to intersect at a substantial center of curvature of hemispherical unit 1 and to block the opening of hemispherical unit 1. Herein, the center of curvature of hemispherical unit 1 typically refers to a center of curvature at the inner face side of hemispherical unit 1. Moreover, mirror 3 has a reflection face (a mirror face) 5 formed on at least the inner face side of hemispherical unit 1.

Further, mirror 3 has a light source window 2 and an illumination window 4 each establishing communicative connection between the inner face side and an outer side of hemispherical unit 1. Light source window 2 is an opening to which a light source OBJ to be measured is attached mainly, and is formed at a region including a disc center point of mirror 3. In other words, light source window 2 is formed at a region including the substantial center of curvature of hemispherical unit 1. Herein, it is preferable that a center of light source OBJ is aligned with the center of curvature of hemispherical unit 1 in order to measure a total flux of light from light source OBJ. A shape of light source window 2 is not particularly limited as long as light source OBJ can be attached to light source window 2 in such a state.

It is to be noted that a type of light source OBJ to be measured is not particularly limited; however, integrating photometer 100 is suitable for measurement of a total flux of light from a surface light source such as an LED (Light Emitting Diode) unit or a flat panel display.

Herein, description will be given of a measurement principle in integrating photometer 100 according to this embodiment. A flux of light generated from light source OBJ is mainly guided toward the inner face of hemispherical unit 1. On the other hand, mirror 3 reflects the flux of light that is generated from light source OBJ, is reflected by hemispherical unit 1 and enters thereinto. Thus, mirror 3 produces a virtual image of the inner face of hemispherical unit 1. As described above, mirror 3 is provided so as to intersect at the center of curvature of hemispherical unit 1, so that a space between mirror 3 and hemispherical unit 1 is formed into a hemispherical shape having a certain curvature. Therefore, illuminance distribution can be obtained by the inner face of hemispherical unit 1 and the virtual image propduced by mirror 3, and is equal to that obtained in a case of using an integrating sphere which is substantially spherical in shape. In other words, it can be regarded as if two light emitting faces of light source OBJ are arranged symmetrically in the integrating sphere which is spherical in shape. The virtual image described above renders the illuminance at the inner face of hemispherical unit 1 uniform, and the total flux of light from light source OBJ can be calculated from a value of the uniform illuminance.

That is, it is sufficient that a combined state of the space formed between mirror 3 and hemispherical unit 1 and the virtual image of the space, which is produced by mirror 3, can be regarded as a sphere. Therefore, the concept of "the substantial center of curvature of the hemispherical unit" involves a proximal position where illuminance distribution substantially equal to that in the case of using the spherical integrating sphere as described above can be obtained, in addition to the complete center of curvature of hemispherical unit 1.

Meanwhile, illumination window 4 is an opening for guiding a flux of light from a correcting light source 9 used for measurement of self-absorption toward the inner face of hemispherical unit 1. Illumination window 4 is formed at a position spaced away from light source window 2 by a predetermined distance. Herein, it is preferable that direct incidence of the flux of light from correcting light source 9 onto a light emitting face of light source OBJ is suppressed as much as possible.

A light source storing unit 11 is provided at an outside of hemispherical unit 1 with mirror 3 being interposed therebetween, so as to establish communicative connection with illumination window 4. Correcting light source 9 is provided inside light source storing unit 11, and the flux of light from correcting light source 9 passes through illumination window 4 and, then, is guided to the inner face of hemispherical unit 1. As will be described later, correcting light source 9 is a self-absorption measuring light source for calculating a correcting coefficient resulted from light-absorption by light source OBJ to be measured. In the following description, the flux of light generated from correcting light source 9 will be also referred to as "correcting flux of light" in order to distinguish this flux of light from the flux of light generated from light source OBJ. As shown in FIG. 2, herein, an optical axis of the correcting flux of light substantially corresponds to a line which passes through illumination window 4 and is perpendicular to the disc face of mirror 3. In general, the correction of the self-absorption by light source OBJ in the integrating sphere is intended for correcting a component of light that is emitted from light source OBJ, then, is reflected repeatedly by the inner face of the integrating sphere, and finally enters into light source OBJ to be absorbed by light source OBJ. Hence, the correcting flux of light must enter into light source OBJ in course of the repetitive reflection by the inside of the integrating sphere as in the case of the light emitted from light source OBJ. If the correcting flux of light directly enters into light source OBJ without reflection by the inner face of the integrating sphere, illumination conditions that the self-absorption occurs upon measurement of the flux of light from light source OBJ differ disadvantageously, resulting in erroneous self-absorption correction. However, integrating photometer 100 according to this embodiment adopts such a configuration that the flux of light is guided in the direction perpendicular to the disc face through each of windows 2 and 4 provided at different positions on the single disc face of mirror 3, thereby preventing the correcting flux of light guided through illumination window 4 from directly entering into light source OBJ. This configuration allows suppression of erroneous measurement.

The illuminance at the inside of hemispherical unit 1 is detected by a light receiving unit 7 through an observation window 6 formed on any one of hemispherical unit 1 and mirror 3. In the configuration shown in FIG. 2, typically, observation window 6 is formed on the inner face of hemispherical unit 1 at a position spaced away from illumination window 4. This is because the correcting flux of light from correcting light source 9 is prevented from directly entering into light receiving unit 7. Alternatively, observation window 6 may be formed on mirror 3.

In order to prevent the flux of light from light source OBJ from directly entering into light receiving unit 7, further, a shielding unit 8 is formed on a path extending from light source OBJ to observation window 6. Herein, it is preferable that shielding unit 8 has a surface of which reflectivity is relatively made higher, in order to prevent light absorption thereby.

A control unit 10 is configured to receive a signal indicating the illuminance at the inner face of hemispherical unit 1 measured by light receiving unit 7. Then, control unit 10 calculates a self-absorption correcting coefficient of light source OBJ and a total flux of light from light source OBJ, based on an output corresponding to the measured illuminance.

In the configuration shown in FIG. 2, since illumination window 4 and light source window 2 are on a common plane, no flux of light from correcting light source 9 directly enters into the light emitting face of light source OBJ. As described above, the self-absorption by light source OBJ results from the fact that the light emitted from light source OBJ is reflected repeatedly by the inner face of the integrating sphere, then, enters into light source OBJ to be absorbed by light source OBJ. In view of an optical aspect, therefore, as a distance between illumination window 4 and light source window 2 is made shorter, the light through illumination window 4 can be approximated to the light guided through light source window 2.

<Procedure for Calculation of Self-Absorption Correcting Coefficient>

Figure 3:
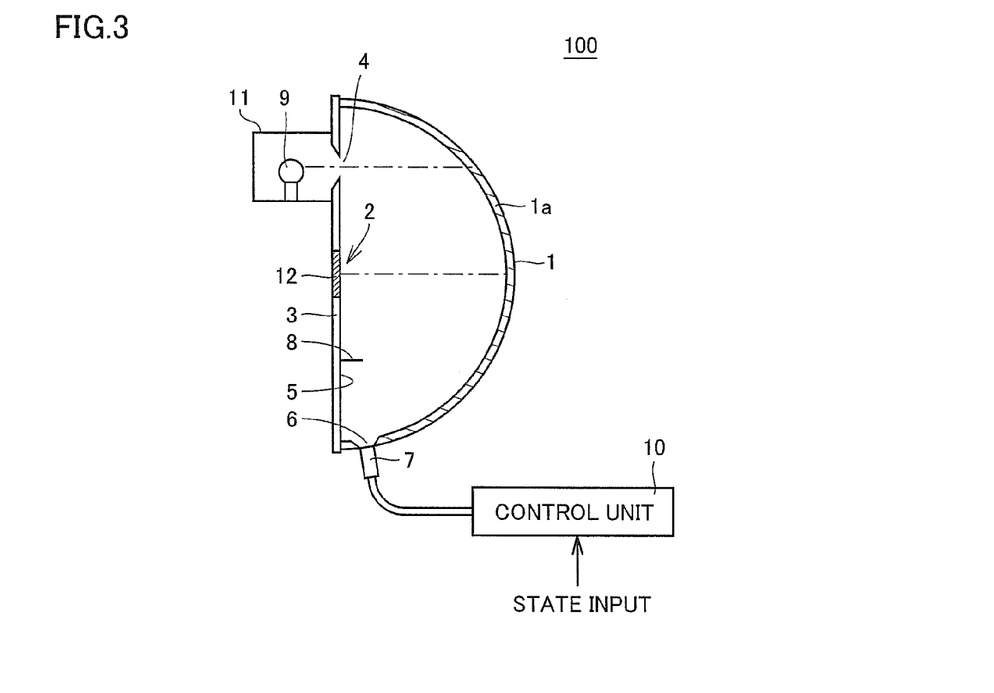
FIG. 3 schematically illustrates a state that a light source to be measured is not attached.

With reference to FIGS. 2 and 3, next, description will be given of a procedure for calculation of self-absorption correcting coefficient α of light source OBJ, in integrating photometer 100 according to this embodiment.

With reference to FIG. 3, light source window 2 is configured such that a calibration mirror 12 having a size equal to that of an opening region of light source window 2 can be attached to light source window 2 along an identical plane with the mirror face of mirror 3, in addition to light source OBJ. More specifically, in a state that light source OBJ is not attached to light source window 2, calibration mirror 12 is attached to light source window 2 in place of light source OBJ. Accordingly, a reflection face (a mirror face) is formed throughout the entire disc face (excluding a portion corresponding to illumination window 4) of mirror 3 including a region corresponding to light source window 2. In the state shown in FIG. 3, an illuminance to be detected by light receiving unit 7 based on the correcting flux of light from correcting light source 9 corresponds to a standard value from which an influence of the self-absorption by light source OBJ is eliminated. As shown in FIG. 2, in a state that light source OBJ is attached to light source window 2 without lighting up, then, an illuminance to be detected by light receiving unit 7 based on the correcting flux of light from correcting light source 9 is standardized by this standard value, so that self-absorption correcting coefficient α of light source OBJ can be calculated.

That is, when an output value from light receiving unit 7 in accordance with the illuminance obtained by the correcting flux of light in the state shown in FIG. 3 is represented by $i_0$ and an output value from light receiving unit 7 in accordance with the illuminance obtained by the correcting flux of light in the state shown in FIG. 2 is represented by $i_1$, self-absorption correcting coefficient α of light source OBJ can be expressed by the following equation.

$$\alpha = i_1/i_0$$

Further, the illuminance obtained by the flux of light generated from light source OBJ is corrected through use of self-absorption correcting coefficient α, and the total flux of light from light source OBJ can be measured through use of this corrected illuminance.

Specifically, a theoretical relation between total flux φ of light from light source OBJ and illuminance Ed detected by light receiving unit 7 in a case of reflecting self-absorption correcting coefficient α is expressed as follows.

$$\phi \approx 2\pi r^2 \times \alpha \times Ed \times \{(1-\rho)/\rho\} \propto \alpha \times i_d$$

Herein, r represents a radius from the center of curvature to the inner face in hemispherical unit 1 and ρ represents a reflectivity at the inner face of hemispherical unit 1. Each of the two values is known. In addition, $i_d$ represents an output value from light receiving unit 7 in a case where correcting light source 9 is in a non-light emitting state while light source OBJ is in a light emitting state.

That is, total flux of light φ from light source OBJ is proportional to a product of self-absorption correcting efficient α and output value $i_d$ from light receiving unit 7. In actual, it is difficult to accurately measure an absolute illuminance to be detected by light receiving unit 7. Therefore, the total reflux of light from light source OBJ is measured indirectly by comparison with a result of measurement of a total-flux-of-light standard light source of which an amount of a total flux of light to be generated is known in advance.

<Control Structure>

Figure 4:
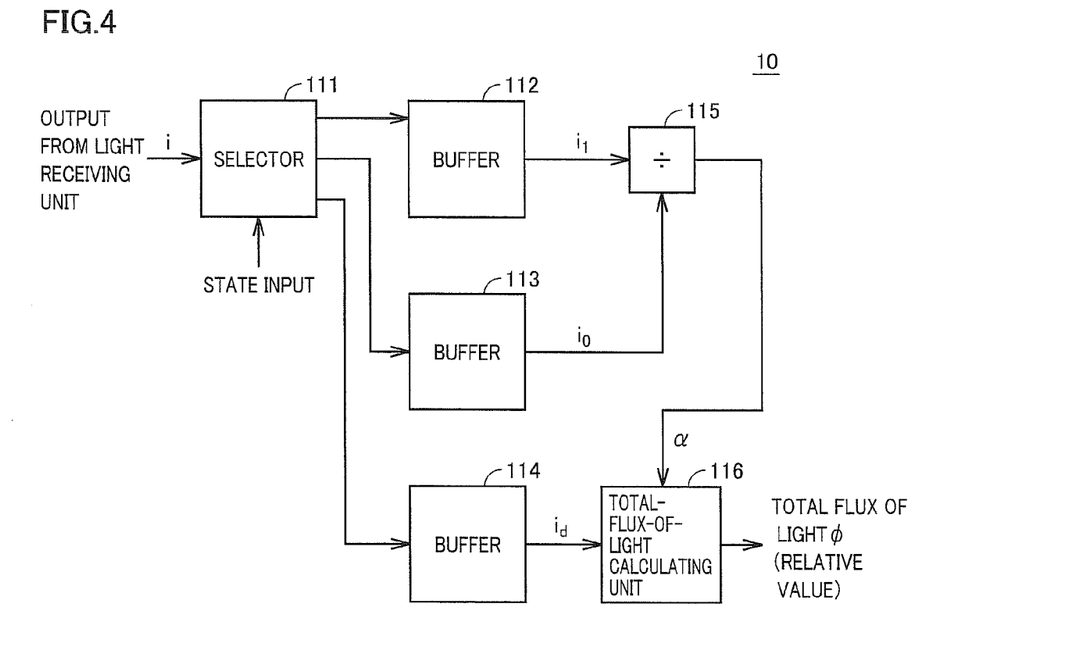
FIG. 4 schematically shows a control structure in a control unit according to the first embodiment of the present invention.

With reference to FIG. 4, control unit 10 according to the first embodiment of the present invention includes, as functions thereof, a selector 111, buffers 112, 113 and 114, a divider 115, and a total-flux-of-light calculating unit 116.

Selector 111 selectively outputs an output value from light receiving unit 7 to any one of buffers 112, 113 and 114, in accordance with a state input from a user or the like. Herein, the state input typically includes the following three cases:

(1) a case where light source OBJ is attached to light source window 2 and only correcting light source 9 is in the light emitting state;

(2) a case where calibration mirror 12 is attached to light source window 2 and only correcting light source 9 is in the light emitting state; and (3) a case where light source OBJ is attached to light source window 2 and only light source OBJ is in the light emitting state.

That is, the user sets the state shown in FIG. 2 or 3, and then gives a state input to control unit 10 in accordance with each state.

In a case where the state (1) is input as a state input, buffer 112 receives from selector 111 the output value of light receiving unit 7, and then holds and outputs the received value as an output value $i_1$. In a case where the state (2) is input as a state input, moreover, buffer 113 receives from selector 111 the output value of light receiving unit 7, and then holds and outputs the output value as an output value $i_0$. In a case where the state (3) is input as a state input, further, buffer 114 receives from selector 111 the received value of light receiving unit 7, and then holds and outputs the received value as an output value $i_d$. Herein, each of buffers 112, 113 and 114 may be configured to include a noise canceling circuit and an averaging circuit.

Divider 115 divides output value $i_1$ output from buffer 112 by output value $i_0$ output from buffer 113, and then outputs a quotient, as a self-absorption correcting coefficient α, to total-flux-of-light calculating unit 116.

Total-flux-of-light calculating unit 116 multiplies output value $i_d$ output from buffer 114 by self-absorption correcting coefficient α output from divider 115, and then outputs a resultant value as a relative value according to a total flux of light φ from light source OBJ. In order to calculate the output value, herein, total-flux-of-light calculating unit 116 may further multiply the resultant value by a coefficient according to a design constant of relevant integrating photometer 100.

<Lighting Posture>

As shown in FIG. 1, hemispherical unit 1 is configured to be rotatable; therefore, integrating photometer 100 according to this embodiment can readily measure a total flux of light by consecutively changing a lighting posture of light source OBJ.

Figure 5A:
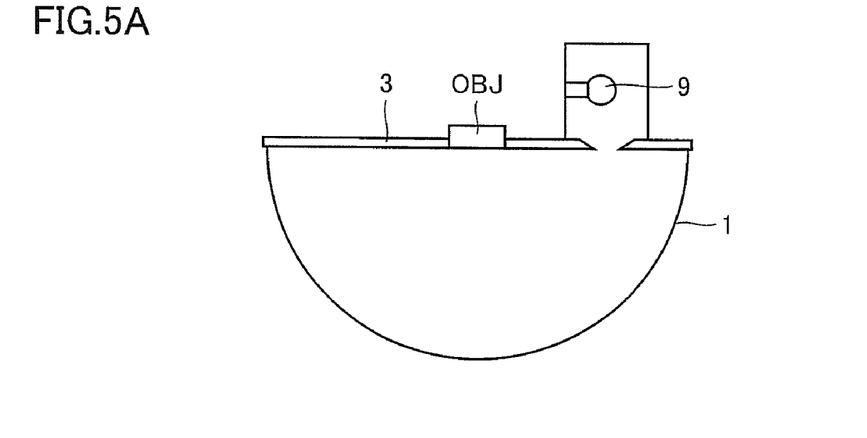
FIGS. 5A to 5C schematically show a measuring mode using the integrating photometer according to the first embodiment of the present invention.
Figure 5B:
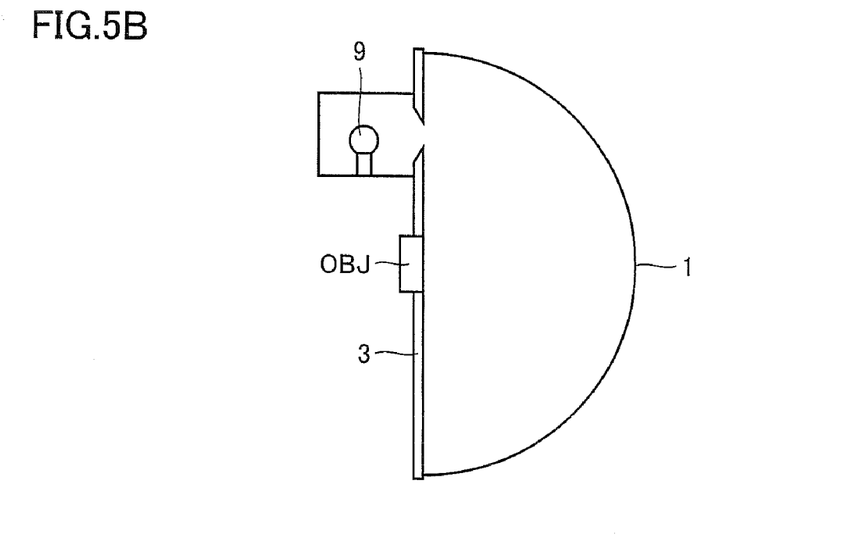
Figure 5C:
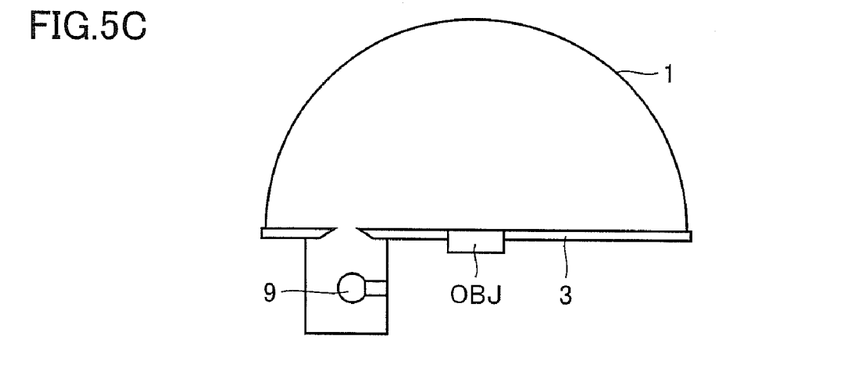

With reference to FIGS. 5A to 5C, self-absorption correcting coefficient α is obtained in advance, light source OBJ is attached to light source window 2, hemispherical unit 1 is sequentially set at an appropriate rotation angle, and the total flux of light from light source OBJ is sequentially measured at each rotation angle. Depending on types, light sources OBJ are different in light emitting performance from one another in accordance with a lighting posture. Integrating photometer 100 according to this embodiment can promptly evaluate the light emitting performance of light source OBJ. As one of reasons why light sources OBJ are different in light emitting performance from one another in accordance with the lighting posture, there has been known a reason that light sources OBJ are different in heat radiating property from one another in accordance with the lighting posture and, therefore, are different in internal temperature from one another.

<Procedure for Measurement>

Figure 6:
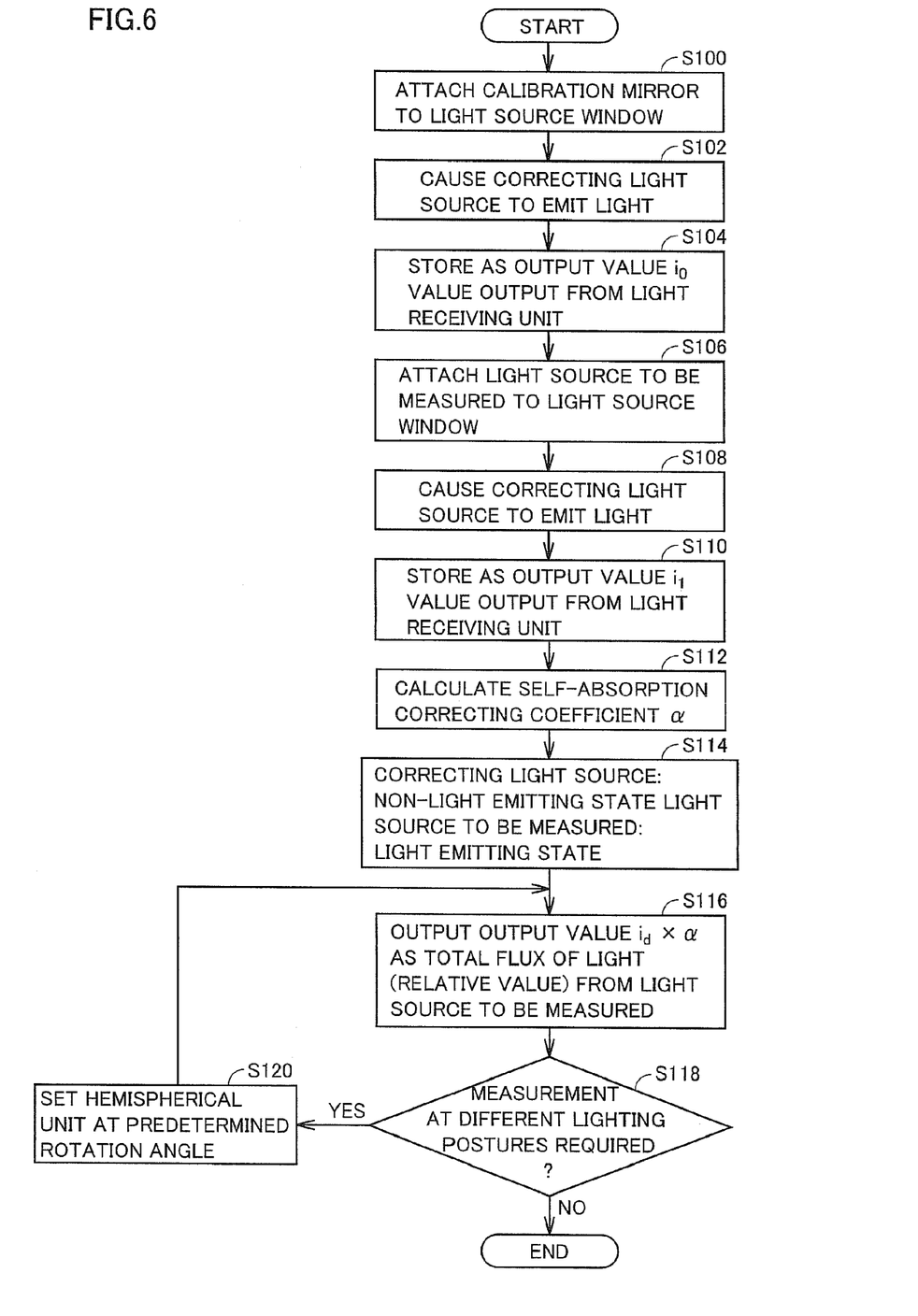
FIG. 6 shows a flowchart of a processing procedure concerning measurement of a total flux of light through use of the integrating photometer according to the first embodiment of the present invention.

With reference to FIG. 6, next, description will be given of a processing procedure concerning the measurement of the total flux of light through use of integrating photometer 100 according to the first embodiment of the present invention.

First, the user prepares integrating photometer 100, attaches calibration mirror 12 to light source window 2 (step S100), and causes correcting light source 9 to emit light (step S102). Then, the user inputs to control unit 10 a selection command indicating the state (2), that is, "calibration mirror 12 is attached to light source window 2 and only correcting light source 9 is in the light emitting state". Thus, control unit 10 temporarily stores as an output value $i_0$ a value output from light receiving unit 7 at this time (step S104).

Next, the user attaches light source OBJ to be measured to light source window 2 (step S106), and causes correcting light source 9 to emit light (step S108). Then, the user inputs to control unit 10 a selection command indicating the state (1), that is, "light source OBJ is attached to light source window 2 and only correcting light source 9 is in the light emitting state". Thus, control unit 10 temporarily stores as an output value $i_1$ a value output from light receiving unit 7 at this time (step S110).

Further, control unit 10 divides output value $i_1$ by output value $i_0$ to calculate a self-absorption correcting coefficient α (step S112). Control unit 10 stores self-absorption correcting coefficient α calculated as described above.

Next, the user causes correcting light source 9 to emit no light, but causes light source OBJ to be measured to emit light in the state that light source OBJ is attached to light source window 2 (step S114). Then, the user inputs to control unit 10 a selection command indicating the state (3), that is, "light source OBJ is attached to light source window 2 and only light source OBJ is in the light emitting state". Thus, control unit 10 multiplies an output value $i_d$, which is a value output from light receiving unit 7 at this time, by self-absorption correcting coefficient α calculated in step S112, and then outputs a resultant value as a total flux of light (a relative value) from light source OBJ to be measured (step S116).

In a case where measurement at different lighting postures must be performed (YES in step S118), thereafter, the user sets hemispherical unit 1 at a predetermined rotation angle (step S120), and causes control unit 10 to execute the processes in step 116 and the steps subsequent thereto.

In a case where no measurement at different lighting postures must be performed (NO in step S118), on the other hand, this measurement processing is completed.

<Modification>

In the integrating photometer according to the first embodiment described above, a type of correcting light source 9 is not particularly limited. When a specific type of light source OBJ is measured, it is preferable that a light source which is identical in type with light source OBJ is used as correcting light source 9.

For example, a fluorescent mercury lamp has a configuration that a phosphor is applied to an inner face of an outer tube thereof, and emits light generated from the mercury lamp itself and fluorescence generated by the phosphor that receives a part of the light. In general, the mercury lamp has an emission line spectrum containing ultraviolet rays of 254 nm and 365 nm. The ultraviolet rays may enter into the phosphor of the fluorescent mercury lamp when being diffused and reflected in the inner face and the like of hemispherical unit 1. Therefore, there occurs a "reexcitation phenomenon" that the phosphor emits light again by the ultraviolet rays emitted once from the fluorescent mercury lamp. The "reexcitation phenomenon" may occur also in a case of using a white LED.

Figure 7:
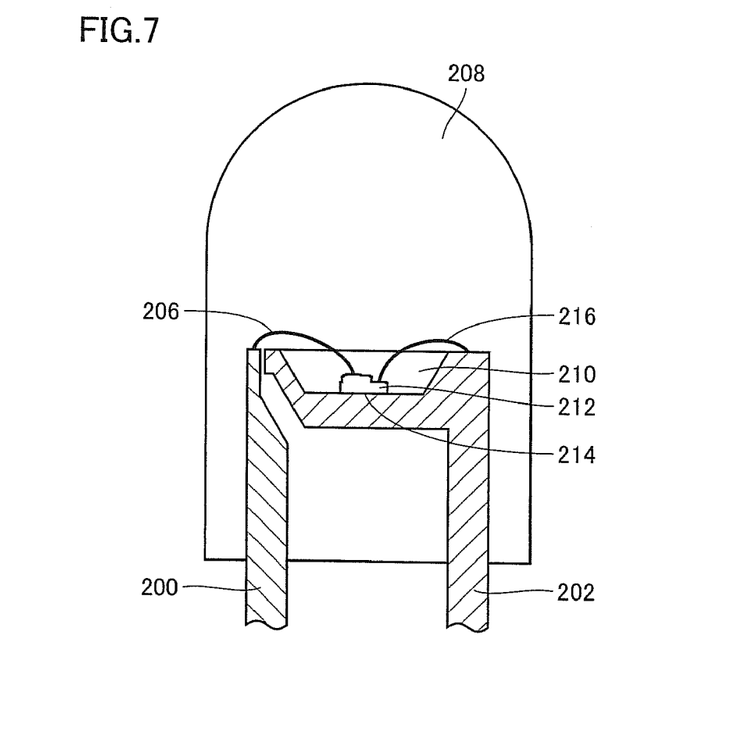
FIG. 7 shows a sectional view of a typical structure of a white LED.

With reference to FIG. 7, the white LED includes an LED chip 212 formed on a cathode 202, which is a lead frame, with a silver paste 214 being interposed therebetween. In addition to cathode 202, the white LED also includes an anode 200 which is a lead frame. Herein, LED chip 212 is electrically connected to anode 200 through a bonding wire 206 and, also, is electrically connected to cathode 202 through a bonding wire 216. Further, LED chip 212 has a top surface sealed with a sealant 210 containing a phosphor dispersed therein. Then, LED chip 212 and sealant 210 are packaged into a bullet shape to form a lens 208.

Sealant 210 which is a phosphor is irradiated with light emitted from LED chip 212. Then, fluorescence generated from sealant 210 is diffused and radiated through lens 208. Herein, a typical white LED includes a blue LED as LED chip 212, and a YAG (Yttrium-Aluminum-Garnet) phosphor as the phosphor. The white LED emits a part of blue component light from LED chip 212. However, this blue component light may enter into sealant 210 when being diffused and reflected in the inner face and the like of hemispherical unit 1. Consequently, there occurs a "reexcitation phenomenon" that the phosphor emits light again by the light emitted once from the white LED.

In order to correct erroneous measurement due to the above-described reexcitation phenomenon in addition to a self-absorption phenomenon, accordingly, it is preferable that a light source which is identical in type with light source OBJ to be measured is used as correcting light source 9. Herein, the term "light source which is identical in type" means that a wavelength component (a spectrum) of light generated from correcting light source 9 is substantially equivalent to a wavelength component (a spectrum) of light generated from light source OBJ. Therefore, the two light sources are not necessarily identical with each other completely.

As described above, a light source which is identical in type with light source OBJ is used as correcting light source 9, so that a self-absorption correcting coefficient α can be calculated in consideration of the self-absorption phenomenon and the reexcitation phenomenon. It is to be noted that a procedure for calculation of self-absorption correcting coefficient α and a procedure for measurement of the total flux of light are similar to those described above; therefore, detailed description thereof will not be given repeatedly.

According to this embodiment, light source window 2 and illumination window 4 are formed on disc-shaped mirror 3 so as to be spaced away from each other by a predetermined distance, light source OBJ to be measured is attached to light source window 2, and the correcting flux of light from correcting light source 9 provided outside hemispherical unit 1 is guided to the inner face of hemispherical unit 1 through illumination window 4. Thus, the correcting flux of light from correcting light source 9 can be prevented from directly entering into light source OBJ. As a result, a baffle for preventing the correcting flux of light from directly entering into light source OBJ is not necessarily provided inside hemispherical unit 1. Hence, it is possible to correct an error due to light absorption (self-absorption) by light source OBJ and to measure a total flux of light with high accuracy while maintaining a simple configuration.

According to this embodiment, further, hemispherical unit 1 is configured to be rotatable. Therefore, it is possible to readily measure total fluxes of light at various lighting postures in a state that light source OBJ is attached to mirror 3.

Second Embodiment

The first embodiment describes the configuration of outputting the relative value according to the total flux of light from light source OBJ to be measured. However, strict setting of the flux of light from the correcting light source to the inner face of hemispherical unit 1 allows acquisition of an absolute value of the total flux of light from light source OBJ by one-time measurement.

Figure 8:
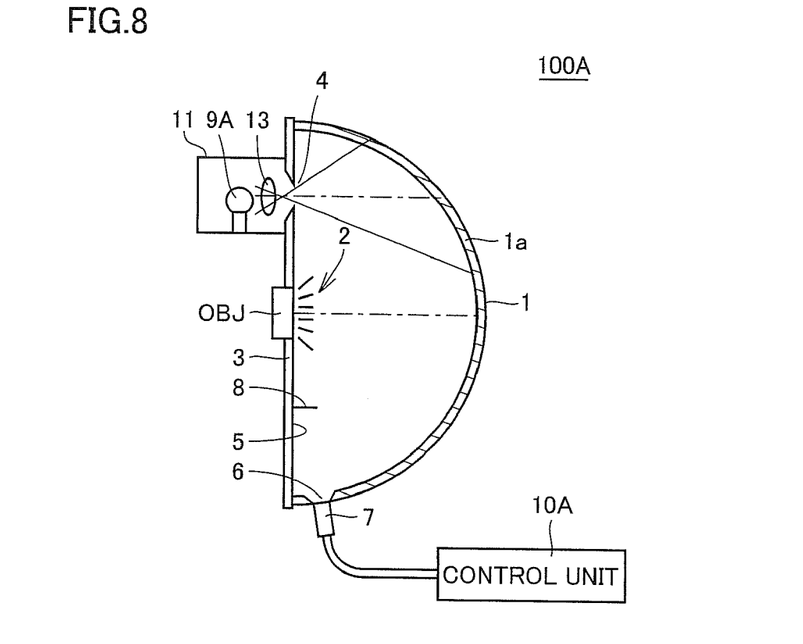
FIG. 8 schematically shows a sectional structure of an integrating photometer according to a second embodiment of the present invention.

With reference to FIG. 8, an integrating photometer 100A according to a second embodiment of the present invention is different from integrating photometer 100 according to the first embodiment described above, in the following points. That is, a condensing optical system 13 is additionally provided, and a correcting light source 9A and a control unit 10A are newly provided in place of correcting light source 9 and control unit 10. Other units are similar to those in integrating photometer 100; therefore, detailed description thereof will not be given repeatedly.

Correcting light source 9A is a luminous intensity standard light source designed such that a luminous intensity of light generated therefrom has a prescribed value. The luminous intensity refers to an amount of a flux of light per unit solid angle. Therefore, a solid angle (an opening area) of light emitted from correcting light source 9A is designed accurately, so that an amount of a standard flux of light to be emitted from correcting light source 9A to an inner face of a hemispherical unit 1 can be determined optionally.

More specifically, condensing optical system 13 is provided on an optical axis of correcting light source 9A and that of an illumination window 4 and is appropriately designed in an optical manner, so that a standard flux of light to be guided to hemispherical unit 1 through illumination window 4 can be determined from a flux of light from correcting light source 9A. In order to determine the standard flux of light more accurately, it is preferable that such a standard flux of light is calibrated by comparison with a prescribed standard lamp, and the like. In order to reduce illumination window 4 in size as much as possible, herein, it is preferable that condensing optical system 13 is designed such that the correcting flux of light from correcting light source 9A is converged on illumination window 4.

When an output value output from a light receiving unit 7 in accordance with an illuminance by a correcting flux of light (a standard flux of light $\phi_0$) from correcting light source 9A is represented by $i_0$ in a case where a calibration mirror 12 is attached to a light source window 2 and only coffecting light source 9A is in a light emitting state and an output value output from light receiving unit 7 is represented by $i_d$ in a case where light source OBJ is attached to light source window 2 and only light source OBJ is in the light emitting state, a total flux of light $\phi$ from light source OBJ is expressed by the following equation.

$$\phi = \phi_0 \times \alpha \times i_d / i_0$$

Herein, a self-absorption correcting coefficient α is calculated based on a procedure similar to that described above.

As described above, integrating photometer 100A according to this embodiment can measure the absolute value of the total flux of light from light source to be measured OBJ by one-time measurement, without performing measurement by comparison with a total-flux-of-light standard light source.

<Control Structure>

Figure 9:
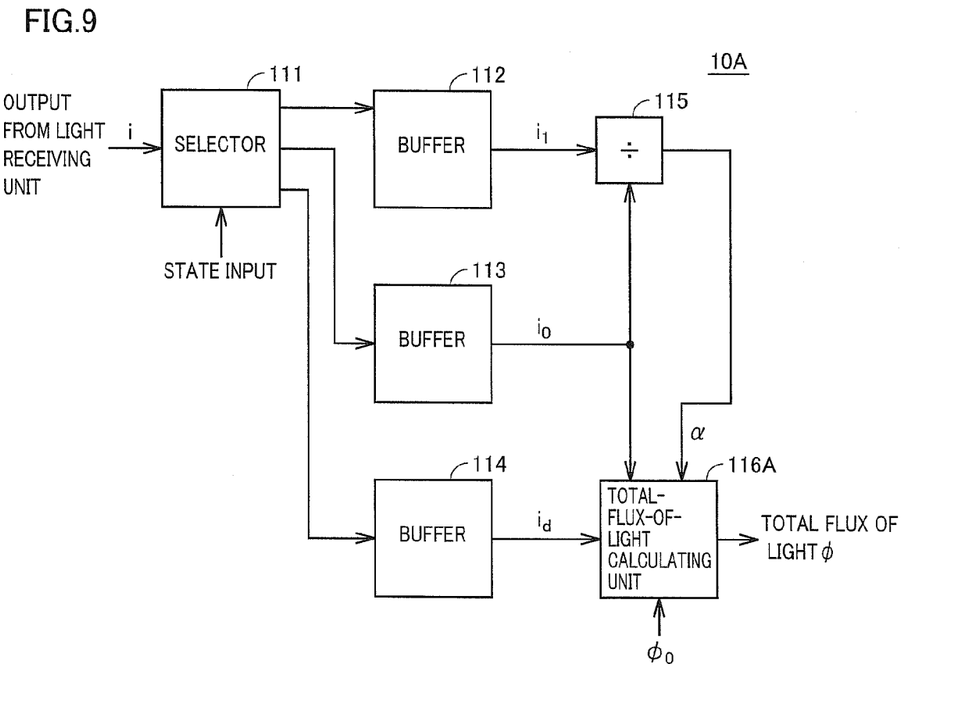
FIG. 9 schematically shows a control structure in a control unit according to the second embodiment of the present invention.

With reference to FIG. 9, control unit 10A according to the second embodiment of the present invention includes, as functions thereof, a selector 111, buffers 112, 113 and 114, a divider 115, and a total-flux-of-light calculating unit 116A. The functional blocks other than total-flux-of-light calculating unit 116A are similar to those in the control structure of control unit 10 shown in FIG. 4; therefore, detailed description thereof will not be given repeatedly.

Total-flux-of-light calculating unit 116A calculates a total flux of light $\phi$ from light source OBJ, based on an output value $i_d$ output from buffer 114, a self-absorption correcting coefficient α output from divider 115, a standard flux of light $\phi_0$ to be guided from correcting light source 9A to an inside of hemispherical unit 1, and an output value $i_0$ output from buffer 113.

Specifically, total-flux-of-light calculating unit 116A calculates total flux of light $\phi$ from the above-described equation ($\phi = \phi_0 \times \alpha \times i_d / i_0$). Herein, standard flux of light $\phi_0$ is preset based on a design value of correcting light source 9A.

<Procedure for Measurement>

Figure 10:
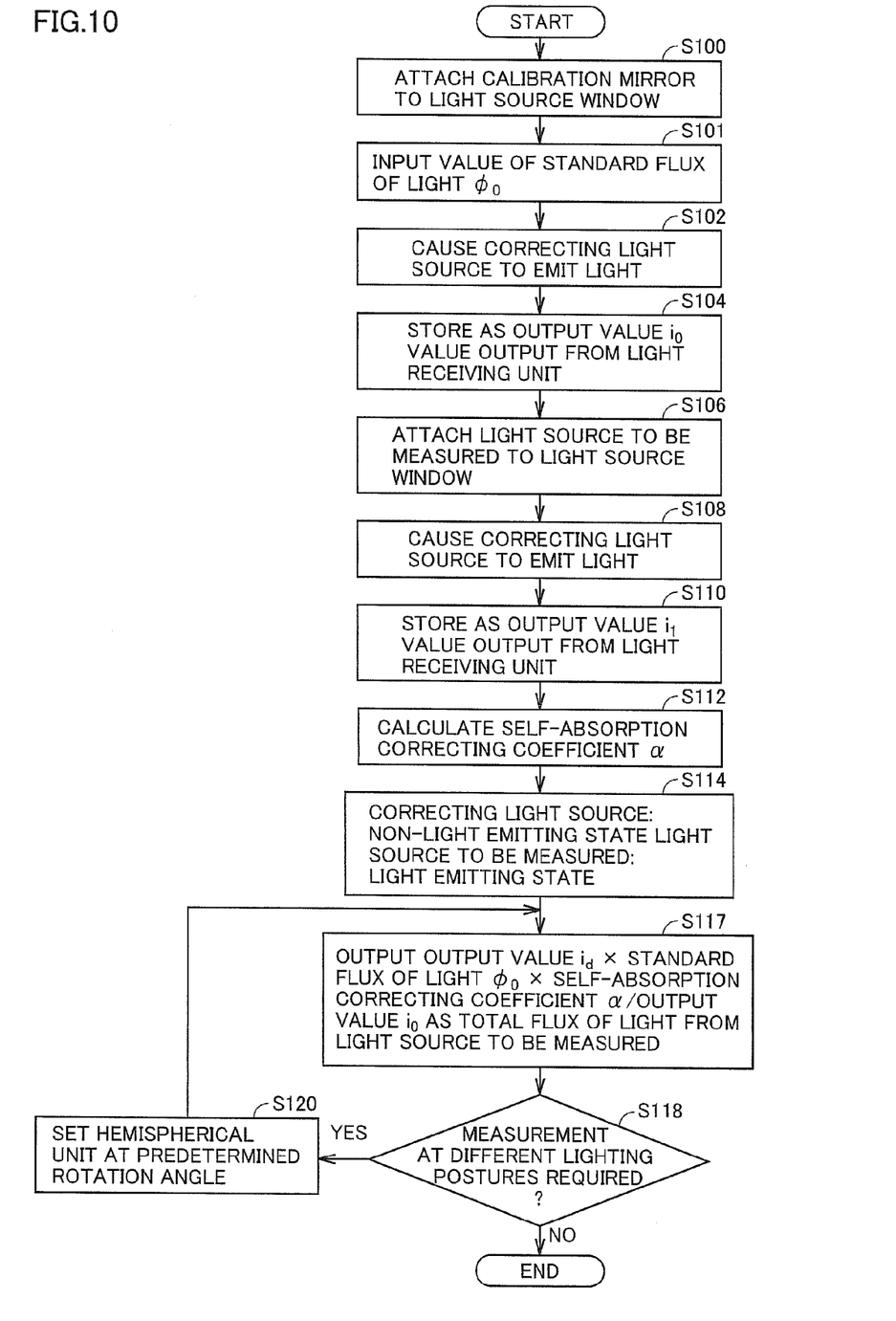
FIG. 10 shows a flowchart of a processing procedure concerning measurement of a total flux of light through use of the integrating photometer according to the second embodiment of the present invention.

With reference to FIG. 10, next, description will be given of a processing procedure concerning the measurement of the total flux of light through use of integrating photometer 100A according to the second embodiment of the present invention. In FIG. 10, reference numbers identical with those in FIG. 6 denote steps in which processes substantially identical with those in the steps in the flowchart shown in FIG. 6 are executed.

First, the user prepares integrating photometer 100A, attaches calibration mirror 12 to light source window 2 (step S100), inputs a value of a standard flux of light $\phi_0$ to control unit 10A (step S101), and causes correcting light source 9A to emit light (step S102). Then, the user inputs to control unit 10A a selection command indicating a state (2), that is, "calibration mirror 12 is attached to light source window 2 and only correcting light source 9A is in the light emitting state".

Thus, control unit 10A temporarily stores as an output value $i_0$ a value output from light receiving unit 7 at this time (step S104).

Next, the user attaches light source OBJ to be measured to light source window 2 (step S106), and causes correcting light source 9A to emit light (step S108). Then, the user inputs to control unit 10A a selection command indicating a state (1), that is, "light source OBJ is attached to light source window 2 and only correcting light source 9A is in the light emitting state". Thus, control unit 10A temporarily stores as an output value $i_1$ a value output from light receiving unit 7 at this time (step S110).

Further, control unit 10A divides output value $i_1$ by output value $i_0$ to calculate a self-absorption correcting coefficient α (step S112). Control unit 10A stores self-absorption correcting coefficient α calculated as described above.

Next, the user causes correcting light source 9A to emit no light, but causes light source OBJ to be measured to emit light in the state that light source OBJ is attached to light source window 2 (step S114). Then, the user inputs to control unit 10A a selection command indicating a state (3), that is, "light source OBJ is attached to light source window 2 and only light source OBJ is in the light emitting state". Thus, control unit 10A multiplies an output value $i_d$, which is a value output from light receiving unit 7 at this time, by standard flux of light $\phi_0$ input in step S101 and self-absorption correcting coefficient α calculated in step S112 and, then, divides a resultant value by output value $i_0$ stored in step S104 to output a resultant value as a total flux of light from light source OBJ to be measured (step S117).

In a case where measurement at different lighting postures must be performed (YES in step S118), thereafter, the user sets hemispherical unit 1 at a predetermined rotation angle (step S120), and causes control unit 10A to execute the processes in step 117 and the steps subsequent thereto.

In a case where no measurement at different lighting postures must be performed (NO in step S118), on the other hand, this measurement processing is completed.

Other configurations are similar to those of integrating photometer 100 according to the first embodiment described above; therefore, detailed description thereof will not be given repeatedly.

According to this embodiment, in addition to the advantages in the first embodiment described above, it is possible to obtain the absolute value of the total flux of light from light source OBJ to be measured by one-time measurement because the flux of light to be guided from correcting light source 9A toward the inner face of hemispherical unit 1 is known in advance. Therefore, it is possible to achieve reduction in measurement time and simplification of a procedure for measurement.

Third Embodiment

Each of the first and second embodiments describes the configuration using the light receiving unit for detecting the absolute value of the illuminance. Alternatively, a spectral-type light receiving unit capable of detecting an illuminance for each wavelength may be used.

Figure 11:
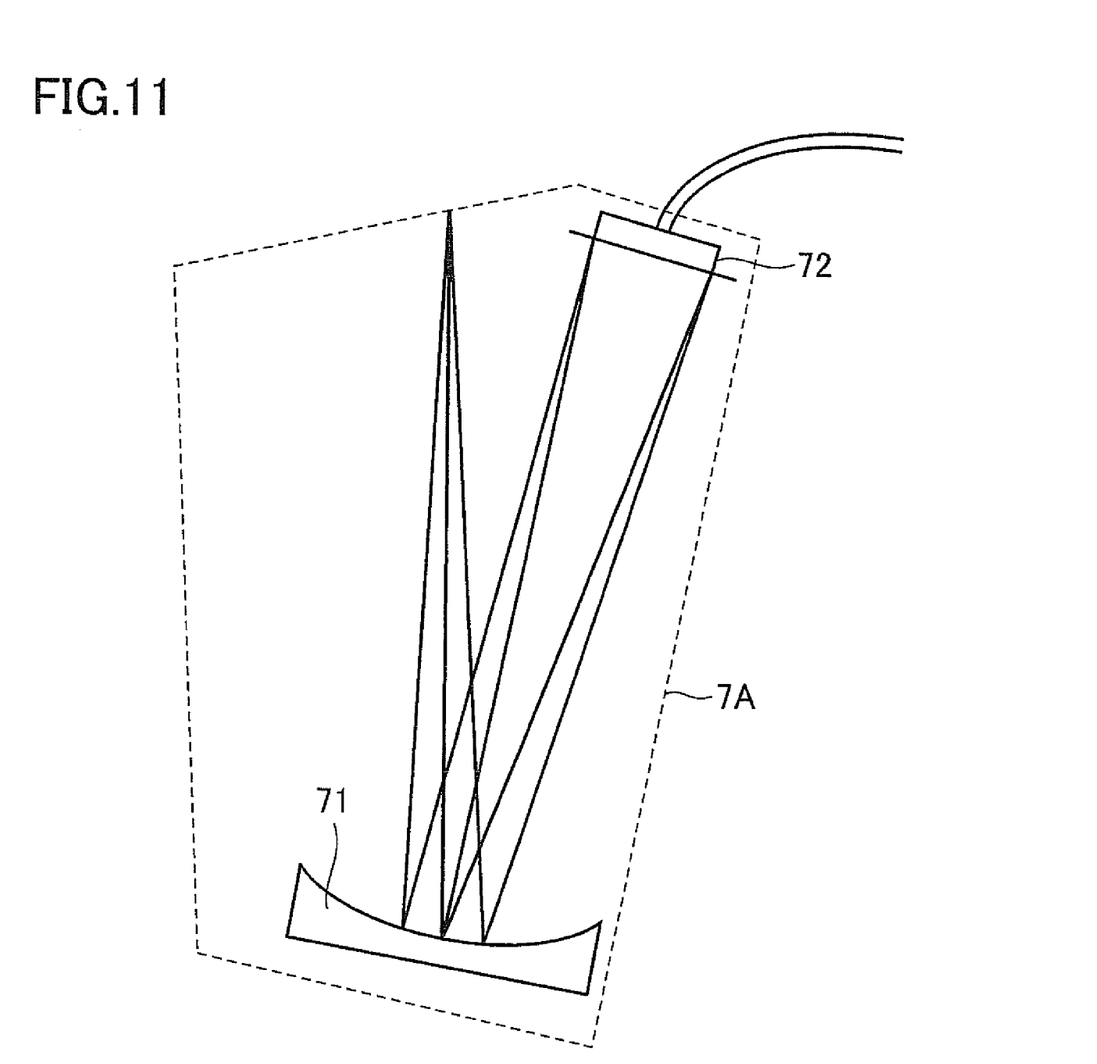
FIG. 11 schematically shows a typical configuration of a light receiving unit according to a third embodiment of the present invention.

With reference to FIG. 11, a spectral-type light receiving unit 7A according to a third embodiment of the present invention includes a reflective-type diffraction grating 71 provided on an optical axis of light extracted from a hemispherical unit 1 through an observation window 6, and a detecting unit 72 receiving diffracted light from diffraction grating 71. Diffraction grating 71 is configured such that diffracted waves at predetermined wavelength intervals are reflected in corresponding directions, respectively, and is typically configured by a grating or the like. Detecting unit 72 outputs an electric signal according to a light intensity of each wavelength component contained in reflected light which is split by diffraction grating 71. Typically, detecting unit 72 includes a photodiode array in which detecting elements such as photodiodes are arranged in an array form, CCDs (Charge Coupled Devices) arranged in a matrix form, and the like.

With this configuration, light receiving unit 7A outputs an output value $i(\lambda)$ in accordance with an illuminance for each wavelength. A control unit according to this embodiment, which is connected to light receiving unit 7A, calculates a self-absorption correcting coefficient for each wavelength. In the control unit according to this embodiment, when an output value output from light receiving unit 7A in accordance with a correcting flux of light is represented by $i_0(\lambda)$ in the state shown in FIG. 3 and an output value output from light receiving unit 7A in accordance with the correcting flux of light is represented by $i_1(\lambda)$ in the state shown in FIG. 2, a self-absorption correcting coefficient $\alpha(\lambda)$ of a light source OBJ to be measured for each wavelength can be expressed by the following equation.

$$\alpha(\lambda)=i_1(\lambda)/i_0(\lambda)$$

Further, an illuminance by a flux of light generated from light source OBJ can be corrected through use of self-absorption correcting coefficient $\alpha(\lambda)$, and then a total flux of light from light source OBJ can be measured for each wavelength through use of the corrected illuminance.

Other configurations as well as a procedure for calculation of the self-absorption correcting coefficient and a procedure for measurement of the total flux of light are similar to those described in the first and second embodiments described above; therefore, detailed description thereof will not be given repeatedly.

According to this embodiment, in addition to the advantages in the first embodiment described above, it is possible to appropriately correct an error due to light absorption (self-absorption) of light source OBJ to be measured even in a case where this self-absorption has a wavelength dependence. Therefore, it is possible to measure the total flux of light from light source OBJ with high accuracy.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An integrating photometer for measuring a total flux of light generated from a light source to be measured, comprising:
   a hemispherical unit having a light diffuse reflection layer provided on an inner face of the hemispherical unit;
   a plate-shaped mirror provided so as to intersect at a substantial center of curvature of said hemispherical unit and to block an opening of said hemispherical unit;
   a light receiving unit measuring an illuminance at the inner face of said hemispherical unit; and
   a correcting light source generating a correcting flux of light, wherein
   said mirror includes:
   a first window, provided at a region including the substantial center of curvature of said hemispherical unit, said light source to be measured is attachable to said first window such that a flux of light generated from said light source to be measured is guided toward the inner face of said hemispherical unit; and a second window provided at a position spaced away from said first window by a predetermined distance, said correcting light source is provided so as to emit said correcting flux of light to the inner face of said hemispherical unit through said second window, said first window is configured such that a calibration mirror having a size equal to that of an opening region of said first window is attachable along an identical plane with a mirror face of said mirror, said integrating photometer further comprising a correcting coefficient calculating unit calculating a correcting coefficient resulted from light absorption by said light source to be measured, based on a first illuminance measured in a case where said light source to be measured in a non-light emitting state is attached to said first window and said correcting light source is in a light emitting state, and a second illuminance measured in a case where said calibration mirror is attached to said first window and said correcting light source is in the light emitting state.

2. The integrating photometer according to claim 1, further comprising a total-flux-of-light calculating unit calculating a total flux of light generated from said light source to be measured, based on a third illumination measured in a case where said light source to be measured in the light emitting state is attached to said first window, and said correcting coefficient.

3. The integrating photometer according to claim 2, wherein said correcting light source is configured such that an amount of said correcting flux of light to be emitted to the inner face of said hemispherical unit through said second window has a prescribed value in advance, and said total-flux-of light calculating unit calculates an absolute value of the total flux of light generated from said light source to be measured, based on said first illumination, said third illumination, said correcting coefficient, and the amount of said correcting flux of light.

4. The integrating photometer according to claim 1, wherein said light receiving unit includes a spectrometer unit measuring an illuminance at the inner face of said hemispherical unit for each wavelength, and said correcting coefficient calculating unit calculates said correcting coefficient for each wavelength.

5. The integrating photometer according to claim 1, wherein said light receiving unit measures said illuminance through a third window provided on one of said hemispherical unit and said mirror, said integrating photometer further comprising a shielding unit provided on a path extending from said first window to said third window.

6. A method for measuring a total flux of light generated from a light source to be measured, comprising the steps of:

preparing an integrating photometer including a hemispherical unit having a light diffuse reflection layer provided on an inner face of the hemispherical unit, and a plate-shaped mirror provided so as to intersect at a substantial center of curvature of said hemispherical unit and to block an opening of said hemispherical unit, said mirror including a first window and a second window provided at a position spaced away from said first window by a predetermined distance;

attaching a calibration mirror having a size equal to that of an opening region of said first window to said first window along an identical plane with a mirror face of said mirror;

guiding a correcting flux of light to the inner face of said hemispherical unit through said second window;

measuring as a first illuminance an illuminance at the inner face of said hemispherical unit;

attaching said light source to be measured in a non-light emitting state to said first window such that a direction of generation of a flux of light is oriented to the inner face of said hemispherical unit;

guiding the correcting flux of light to the inner face of said hemispherical unit through said second window;

measuring as a second illuminance an illuminance at the inner face of said hemispherical unit;

calculating a correcting coefficient resulted from light absorption by said light source to be measured, based on said first and said second illuminance;

measuring as a third illuminance an illuminance at the inner face of said hemispherical unit in a state that said light source to be measured emits light; and using a control unit to calculate a total flux of light generated from said light source to be measured, based on said third illuminance and said correcting coefficient.

7. The method according to claim 6, wherein the step of guiding the correcting flux of light includes guiding the correcting flux of light having an amount of a prescribed value in advance, and the step of calculating the total flux of light includes calculating an absolute value of the total flux of light generated from said light source to be measured, based on said first illumination, said third illumination, said correcting coefficient, and the amount of said correcting flux of light.

8. The method according to claim 6, wherein the step of measuring as the first illuminance includes measuring the illuminance for each wavelength, the step of measuring as the second illuminance includes measuring the illuminance for each wavelength, and the step of calculating the correcting coefficient includes calculating said correcting coefficient for each wavelength.

* * * * *